S. J. BEIGH & E. F. BEARD.
Improvement in Pruning Shears.
No. 122,753. Patented Jan. 16, 1872.
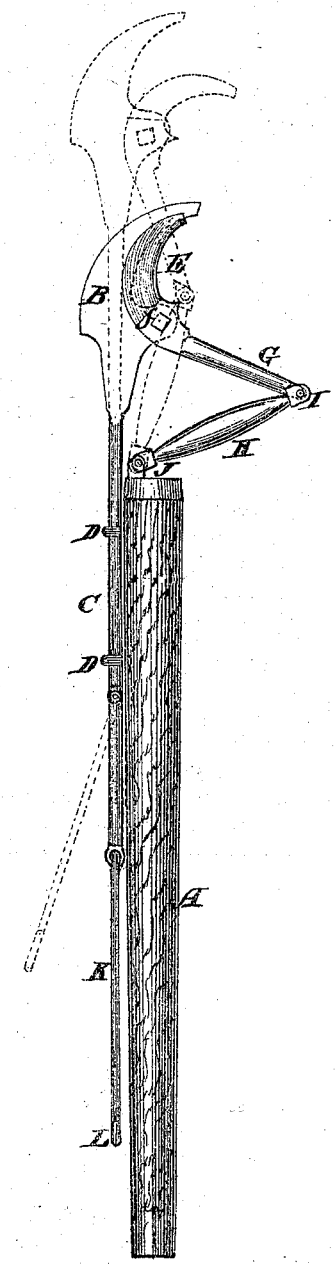

UNITED STATES PATENT OFFICE.

SAMUEL J. BEIGH AND ELI F. BEARD, OF REPUBLIC, OHIO.

IMPROVEMENT IN PRUNING-SHEARS.

Specification forming part of Letters Patent No. 122,753, dated January 16, 1872.

Specification describing a certain Improvement in Pruning-Shears, invented by SAMUEL J. BEIGH and ELI F. BEARD, of Republic, in the county of Seneca and State of Ohio.

This invention relates to instruments for pruning fruit and other trees; and consists in a shears constructed and operating as hereinafter described.

The accompanying drawing represents a side view of our improved pruning-shears.

Similar letters of reference indicate corresponding parts.

A is the staff or pole. B is a semicircular jaw on the end of the long shank C, the two forming a single piece, while the latter is attached to the staff by clips D, so that it will readily slide up and down on the staff. E is the cutting-blade, also of semicircular form, the outer circle forming the cutting-edge with the inner circle of the jaw B. The jaw and the blade E are pivoted together at the point $f$, and the two work together similar to the blades of a common shears. To enable them to thus work, the blade E is provided with a shank, G, which is hinged to the rod H at the point I. The rod H is hinged to the end of the staff at the point J. K is a wire attached to the end of the shank C, with a loop or ring, L, at its end, by which the jaw is drawn down and pushed up in the operation of cutting. The shank G of the blade E and the connecting-rod H approximate to a straight line when the jaws are open. When the jaw B is pulled down and the blades close in the act of cutting, they assume the position seen in the drawing. The shank and the rod form what may be called a "grasshopper" connection, the connection being operated entirely by sliding the long shank of the jaw B upon the staff. In cutting, the blade E acts as a lever whose fulcrum is the joint-pivot $f$. The blade E, owing to the circular form of the cutting-edges, gives the twig to be cut a drawing stroke, thereby greatly lessening the power required in giving a cut square across the grain of the wood.

For trimming hedges, pruning fruit-trees, and for all similar purposes, this implement will be found most useful and convenient.

Having thus described our invention, we claim as new and desire to secure by Letters Patent—

The jaw B, blade E, the shanks C and G, the rod H, and the staff A, combined and arranged to operate substantially as and for the purposes described.

SAMUEL J. BEIGH.
ELI F. BEARD.

Witnesses:
N. E. CHILDS,
J. A. BEARD.

(44)